United States Patent
Hyde et al.

(10) Patent No.: US 8,265,619 B1
(45) Date of Patent: Sep. 11, 2012

(54) TEST CALL AUTOMATION BASED ON MONITORING DEVICE STATE

(75) Inventors: Caleb S. Hyde, Kansas City, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 479 days.

(21) Appl. No.: 12/619,471

(22) Filed: Nov. 16, 2009

(51) Int. Cl.
*H04W 24/00* (2009.01)

(52) U.S. Cl. ..... 455/424; 455/423; 455/425; 455/67.11; 455/67.14

(58) Field of Classification Search .......... 455/423–425, 455/67.11–67.16
See application file for complete search history.

(56) References Cited

U.S. PATENT DOCUMENTS

| | | | | |
|---|---|---|---|---|
| 4,264,959 A | * | 4/1981 | Blaass | 702/71 |
| 5,105,438 A | * | 4/1992 | Ackroff et al. | 375/222 |
| 5,425,076 A | * | 6/1995 | Knippelmier | 379/27.04 |
| 5,490,204 A | * | 2/1996 | Gulledge | 455/423 |
| 5,511,108 A | * | 4/1996 | Severt et al. | 379/21 |
| 5,521,958 A | * | 5/1996 | Selig et al. | 379/21 |
| 5,784,406 A | * | 7/1998 | DeJaco et al. | 375/224 |
| 5,809,108 A | * | 9/1998 | Thompson et al. | 379/10.02 |
| 6,052,584 A | * | 4/2000 | Harvey et al. | 455/423 |
| 7,010,295 B1 | * | 3/2006 | Zerlan et al. | 455/424 |
| 7,313,402 B1 | * | 12/2007 | Rahman | 455/456.1 |
| 7,809,368 B2 | * | 10/2010 | Logan | 455/423 |

* cited by examiner

*Primary Examiner* — Sharad Rampuria

(57) ABSTRACT

A communication system for automating test calls in a wireless communication network comprises a test call automation system and at least one wireless communication device. The test call automation system is configured to receive a set of test conditions and test instructions associated with a test call scenario, and transfer the test conditions and the test instructions to the wireless communication device. The wireless communication device is configured to monitor a device state of the wireless communication device based on the test conditions, and if the device state complies with the set of test conditions, then process the test instructions to execute the test call scenario, receive test results associated with the test call scenario, and transfer the test results to the test call automation system.

18 Claims, 6 Drawing Sheets

TEST CALL AUTOMATION BASED ON MONITORING DEVICE STATE

TECHNICAL BACKGROUND

Individuals and businesses are becoming increasingly reliant on communication networks to send and receive information. For example, individuals may utilize communication networks for voice communications, research, and entertainment, and organizations typically require the use of high speed data networks such as the Internet for conducting critical business transactions. Since users of communication networks have become dependent on these information services, communication service providers have an interest in ensuring customer satisfaction by verifying that wireless communication devices, base stations, and other network elements are operating properly and efficiently.

One manner of ensuring proper communication network operation is to perform various test call scenarios. Typically, network personnel execute test call scenarios by running call scripts that use a preset timer in an attempt to force test call conditions to occur. However, this practice results in several inefficiencies, including repeated call attempts and substantial delay in procuring test results. In addition, the large number of calls placed often requires network personnel to search through numerous test results and call logs to identify specific test call attempts which meet the desired test criteria. Unfortunately, performing brute-force test calls in an attempt to obtain desired test results does not guarantee that the requisite test conditions for a particular test call scenario are met to ensure successfully execution of the test call.

OVERVIEW

A method of automating test calls in a wireless communication network comprises, in a test call automation system, receiving a set of test conditions and test instructions associated with a test call scenario, and transferring the test conditions and the test instructions to at least one wireless communication device. The method further comprises, in the wireless communication device, monitoring a device state of the wireless communication device based on the test conditions, and if the device state complies with the set of test conditions, then processing the test instructions to execute the test call scenario, receiving test results associated with the test call scenario, and transferring the test results to the test call automation system.

A communication system for automating test calls in a wireless communication network comprises a test call automation system and at least one wireless communication device. The test call automation system is configured to receive a set of test conditions and test instructions associated with a test call scenario, and transfer the test conditions and the test instructions to the wireless communication device. The wireless communication device is configured to monitor a device state of the wireless communication device based on the test conditions, and if the device state complies with the set of test conditions, then process the test instructions to execute the test call scenario, receive test results associated with the test call scenario, and transfer the test results to the test call automation system.

A method of automating test calls in a wireless communication network comprises, in a test call automation system, receiving a set of test conditions and test instructions associated with a test call scenario, wherein the test instructions comprise pre-test instructions, mid-test instructions, and post-test instructions, and transferring the test conditions and the test instructions to at least one wireless communication device. The method further comprises, in the wireless communication device, processing the test conditions to determine whether test preconditions are required before a test call is initiated, whether test mid-conditions are required during the test call, and whether test post-conditions are required after the test call is terminated. If the test preconditions are required before the test call is initiated, the method further comprises monitoring a device state of the wireless communication device based on the test preconditions, and if the device state complies with the test preconditions, then processing the pre-test instructions to initiate the test call by calling a target wireless communication device. If the test mid-conditions are required during the test call, the method further comprises monitoring the device state of the wireless communication device during the test call based on the test mid-conditions, and if the device state complies with the test mid-conditions, then processing the mid-test instructions to complete the test call. If the test post-conditions are required after the test call is terminated, the method further comprises monitoring the device state of the wireless communication device after the test call is terminated based on the test post-conditions, and if the device state complies with the test post-conditions, then processing the post-test instructions. The method further comprises receiving test results associated with the test call scenario and transferring the test results to the test call automation system.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
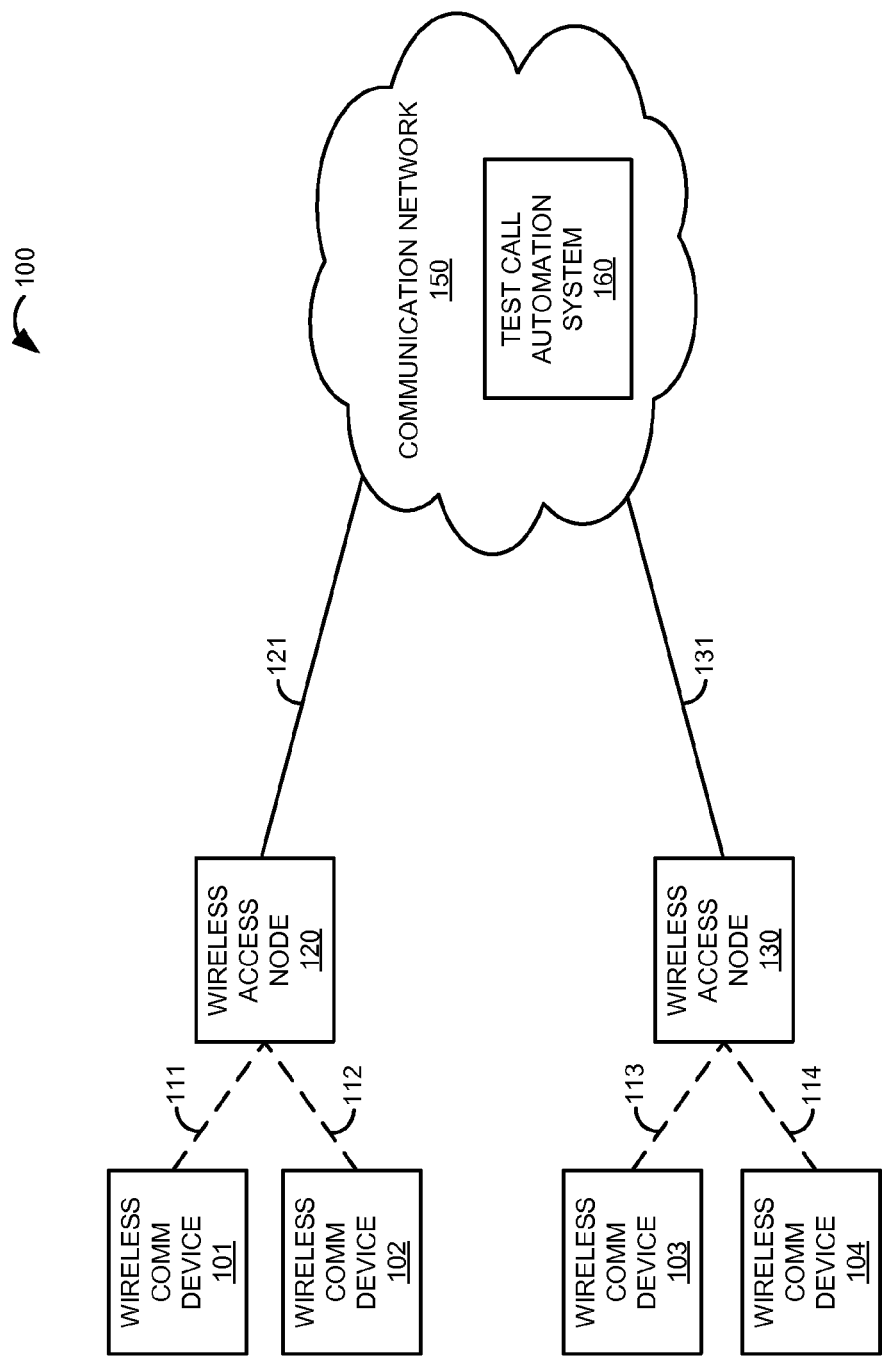
FIG. 1 is a block diagram that illustrates a communication system.

FIG. 1 is a block diagram that illustrates communication system 100. Communication system 100 includes wireless communication devices 101-104, wireless access nodes 120 and 130, and communication network 150. Communication network 150 includes test call automation system 160. Wireless communication devices 101 and 102 communicate with wireless access node 120 over respective wireless communication links 111 and 112. Likewise, wireless communication devices 103 and 104 communicate with wireless access node 130 over respective wireless communication links 113 and 114. Wireless access node 120 is in communication with communication network 150 over communication link 121. Likewise, wireless access node 130 is in communication with communication network 150 over communication link 131.

Figure 2:
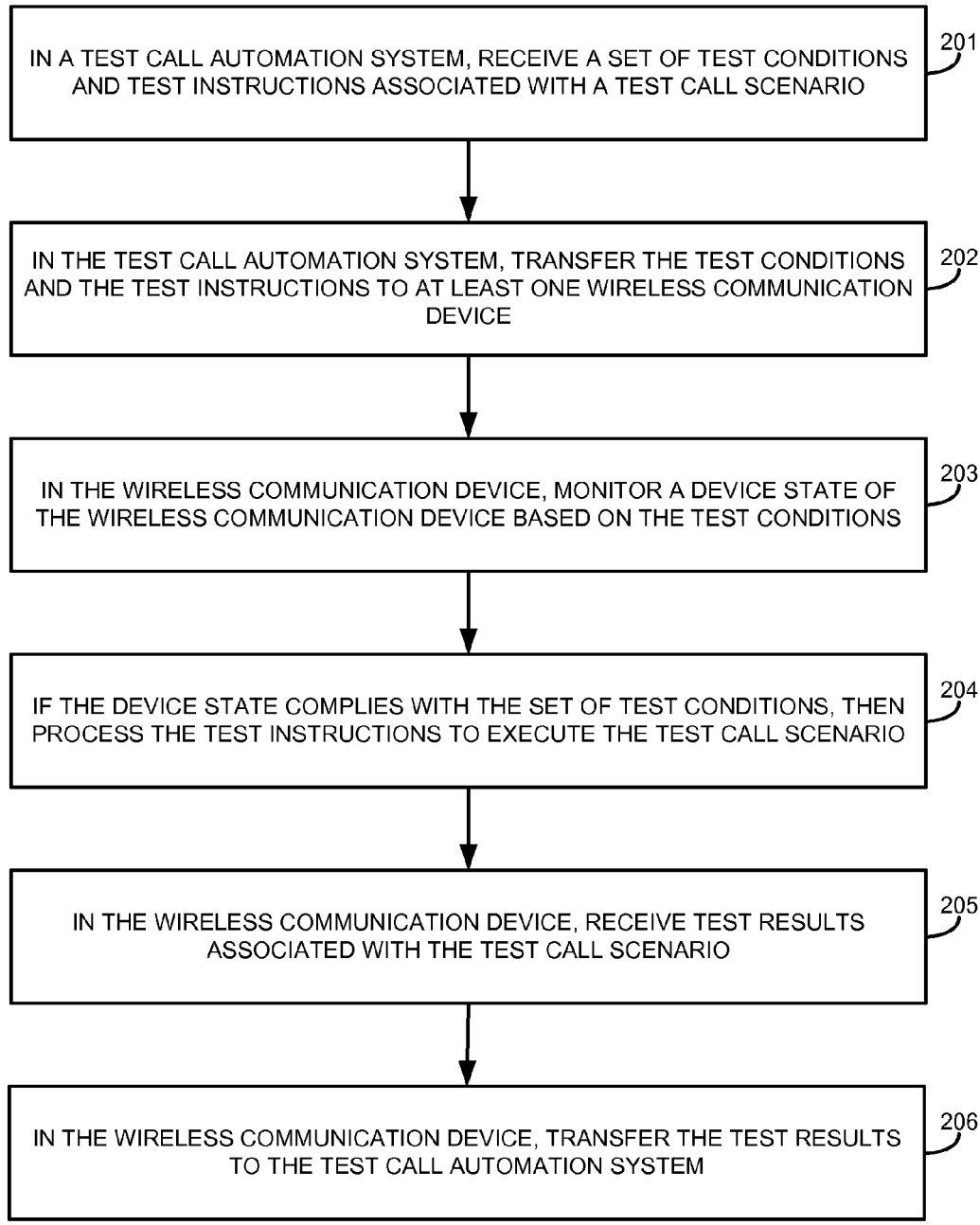
FIG. 2 is a flow diagram that illustrates an operation of the communication system.

FIG. 2 is a flow diagram that illustrates an operation of communication system 100. The steps of the operation are indicated below parenthetically. In FIG. 2, test call automation system 160 receives a set of test conditions and test instructions associated with a test call scenario (201). A test call scenario comprises a particular set of instructions for a test call which require that a corresponding set of test conditions are met for successful execution of the test call scenario. Test call automation system 160 may receive the test conditions and the test instructions in a number of ways. For example, test call automation system 160 could provide drop-down menus or other user input methods to receive the test conditions and test instructions from a user of test call automation system 160. In another example, test call automation system 160 could retrieve the appropriate set of test conditions and test instructions from a database for a particular test call scenario.

The test conditions could comprise device status metrics associated with an external environment of a wireless communication device 101-104, error conditions associated with connections or transmissions, device settings configurable by a user of the wireless communication device 101-104, device specifications and capabilities, or other test conditions. Some examples of device status metrics could relate to Radio Frequency (RF) transmissions, such as received signal strength indication (RSSI), signal to noise ratio (SNR), carrier to noise ratio (CNR), carrier to interference ratio (CIR), carrier to noise and interference ratio (CNIR), active, candidate, and neighbor set pseudorandom number (PN) offsets, Media Access Control (MAC) index, subnet mask, multipath, spreading code, coding rate, or other metrics related to the external wireless environment of the wireless communication device 101-104. Other examples of device status metrics could include time values such as a time of day, day of the week or year, or a duration that another test condition must be maintained. Other device status metrics include position variables such as geographic location, GPS coordinates, market, area code, phone number, cell site, sector, carrier, velocity, or acceleration of the communication device 101-104, for example. Still other device status metrics could include an operational status of the wireless communication device 101-104, such as an idle, sleep, or active mode, communication session type, or some other mode of operation.

As mentioned above, the test conditions could also include error conditions. Examples of error conditions include a rate of abnormal termination, such as a number of dropped or blocked calls, retransmission rate, frame error rate, packet error rate, a particular software or hardware error, or some other error condition. Examples of device settings that could be specified in the test conditions include activation or deactivation of Wi-Fi, Bluetooth, or the ringer/vibration functions, whether the device has an open web browser, email client, or some other application, or any other device settings configurable by a user of the wireless communication device 101-104. The test conditions could also include specifications of the wireless communication device 101-104, such as a device type or model, a software version of the device, dual-mode capability, or some other hardware or software specification.

Once test call automation system 160 receives the test conditions and instructions, test call automation system 160 transfers the test conditions and the test instructions to at least one wireless communication device 101-104 (202). In this example, test call automation system 160 transfers the test conditions and the test instructions to wireless communication device 101.

Wireless communication device 101 monitors a device state of wireless communication device 101 based on the test conditions (203). The device state comprises any metric associated with the wireless communication device that is specified in the test conditions. Wireless communication device 101 continues to monitor the device state until the test conditions are met. However, in some examples, certain test conditions may cause the test call scenario to fail and wireless communication device 101 will cease monitoring the device state. This may occur if the device type or other device specifications or capabilities are not met by the device 101, if device 101 is not in a specified location, or if a duration for monitoring the device state expires, for example. In addition, in some examples, the test instructions may include instructions for the device to download a software update or alter configuration settings in order to ensure device compliance with the test conditions.

If the device state complies with the set of test conditions, then wireless communication device 101 processes the test instructions to execute the test call scenario (204). The test instructions may instruct wireless communication device 101 to function as either the initiator or the recipient of a test call, or both. Thus, in some examples, wireless communication device 101 processes the test instructions to execute the test call scenario by initiating a test call to a target wireless communication device 102-104. In other examples, wireless communication device 101 processes the test instructions to execute the test call scenario by transferring a message to test call automation system 160 or to another wireless communication device 102-104 indicating that device 101 is ready to receive a test call.

In some examples, the test instructions could include specific actions for wireless communication device 101 to perform. For example, the test instructions may specify the session type for the test call by instructing wireless communication device 101 to initiate a voice call, short message service (SMS) message, chat session, email transmission, or some other communication session type. Other actions the test instructions may direct wireless communication device 101 to perform include power cycling, restarting, or resetting the device, executing an application or script, transferring or receiving data, opening or closing a communication session, streaming video, or any other action that wireless communication device 101 is capable of executing.

Prior to, during, and after execution of the test call scenario, wireless communication device 101 receives test results associated with the test call scenario (205). The test results may be received by wireless communication device 101 by executing the test instructions and recording results as directed by the test instructions. Additionally or alternatively, the test results may be received by wireless communication device 101 from another wireless communication device 102-104 participating in the test call scenario. In some examples, the test results may comprise a report on all the test conditions that were met at the time of test execution. Once the test results are received, wireless communication device 101 transfers the test results to test call automation system 160 (206).

Advantageously, test call automation system 160 can broadcast the test instructions and the test results to a plurality of wireless communication devices 101-104, which allows network operators precise specification and control over which test call scenarios are executed. Wireless communication devices 101-104 that do not meet the test conditions do not execute the test instructions, thereby preserving bandwidth and minimizing failed test call attempts by ensuring that only successful test calls are performed. The test results obtained by the test calls may be optimized by including only results of the targeted test call scenarios, thereby simplifying review of the test results by network personnel. Thus, the operation of FIG. 2 provides an efficient, accurate, and automated method of instructing wireless communication devices 101-104 to execute test call scenarios and guarantees the specified test conditions are met.

Referring back to FIG. 1, wireless communication devices 101-104 each comprise any device having wireless communication connectivity with hardware and circuitry programmed to function as a telecommunications device, including RF communication circuitry and an antenna. The RF communication circuitry typically includes an amplifier, filter, modulator, and signal processing circuitry. Wireless communication devices 101-104 may also include a user interface, memory device, software, processing circuitry, or some other communication components. For example, wireless communication devices 101-104 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-104 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication devices 101-104 and wireless access nodes 120 and 130.

Wireless access nodes 120 and 130 comprise RF communication circuitry and an antenna. The RF communication circuitry typically includes an amplifier, filter, RF modulator, and signal processing circuitry. Wireless access nodes 120 and 130 may also comprise a router, server, memory device, software, processing circuitry, cabling, power supply, network communication interface, structural support, or some other communication apparatus. Wireless access nodes 120 and 130 could comprise a base station, Internet access node, telephony service node, wireless data access point, or some other wireless communication system—including combinations thereof. Some examples of wireless access nodes 120 and 130 include a base transceiver station (BTS), base station controller (BSC), radio base station (RBS), Node B, enhanced Node B (eNode B), and others. Wireless network protocols that may be utilized by wireless access nodes 120 and 130 include CDMA, GSM, UMTS, HSPA, EV-DO, EV-DO rev. A, 3GPP LTE, WiMAX, Wi-Fi, Internet, telephony, or some other communication format—including combinations thereof.

Communication network 150 comprises the core network of a wireless communication provider, and could include routers, gateways, telecommunication switches, servers, processing systems, or other communication equipment and systems for providing communication and data services. Communication network 150 could comprise wireless communication nodes, telephony switches, Internet routers, network gateways, computer systems, communication links, or some other type of communication equipment—including combinations thereof. Communication network 150 may also comprise optical networks, asynchronous transfer mode (ATM) networks, packet networks, metropolitan-area networks (MAN), or other network topologies, equipment, or systems—including combinations thereof. Communication network 150 may be configured to communicate over metallic, wireless, or optical links. Communication network 150 may be configured to use time-division multiplexing (TDM), Internet Protocol (IP), Ethernet, optical networking, wireless protocols, communication signaling, or some other communication format—including combinations thereof. In some examples, communication network 150 includes further access nodes and associated equipment for providing communication services to many wireless communication devices across a large geographic region.

Test call automation system 160 comprises a computer system and communication interface. Test call automation system 160 may also include other components such as a router, server, data storage system, and power supply. Test call automation system 160 may reside in a single device or may be distributed across multiple devices. Test call automation system 160 may be a discrete system or may be integrated within other systems—including other systems within communication system 100. Test call automation system 160 could comprise a packet gateway, mobile switching center, network gateway system, Internet access node, application server, service node, firewall, or some other communication system—including combinations thereof.

Wireless communication links 111-114 use the air or space as the transport medium. Wireless communication links 111-114 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Wireless communication links 111-114 may transfer many different signals sharing the same link. For example, wireless communication links 111-114 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport media—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 could be direct links or may include intermediate networks, systems, or devices.

Figure 3:
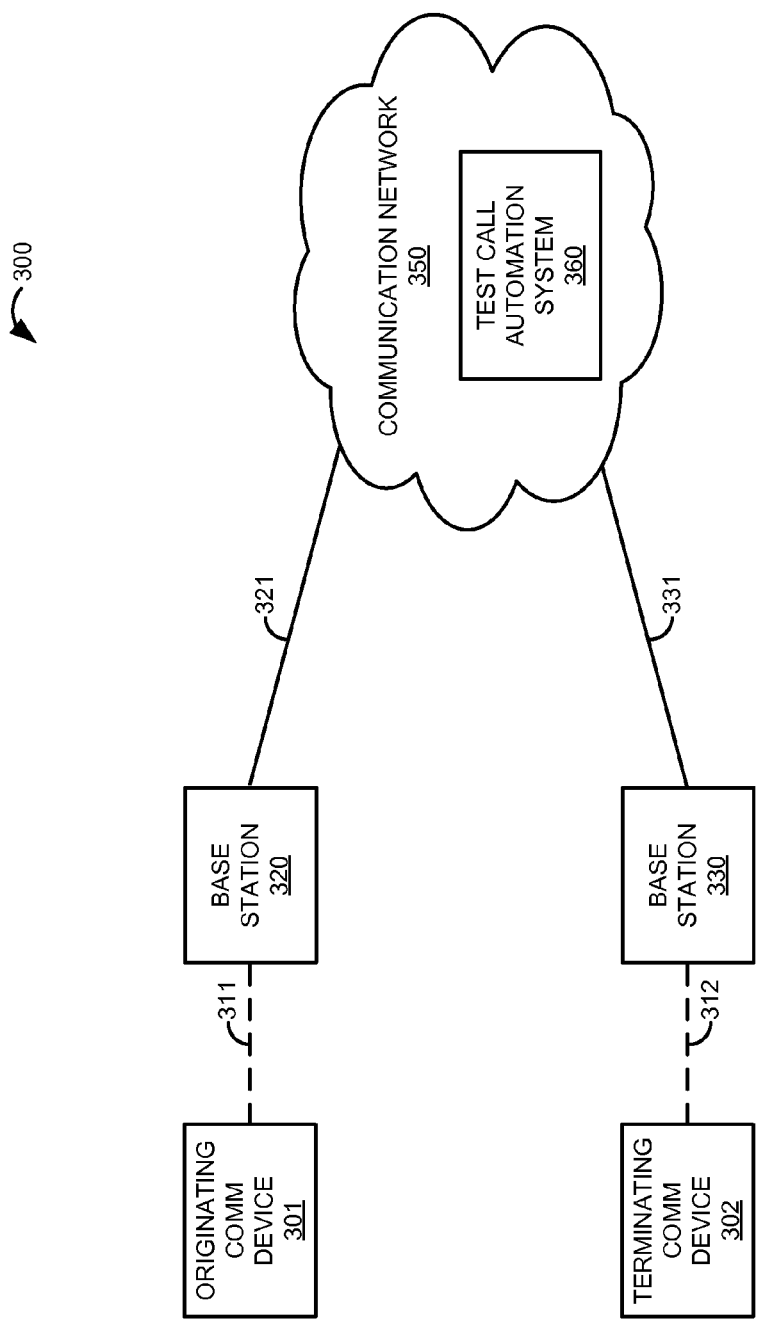
FIG. 3 is a block diagram that illustrates a communication system in an exemplary embodiment.

FIG. 3 is a block diagram that illustrates communication system 300 in an exemplary embodiment. Communication system 300 represents a CDMA EV-DO wireless communication network. Communication system 300 includes originating communication device 301, terminating communication device 302, base stations 320 and 330, and communication network 350. Communication network 350 includes test call automation system 360. Originating communication device 301 communicates with base station 320 over wireless communication link 311. Likewise, terminating communication device 302 communicates with base station 330 over wireless communication link 312. Base station 320 is in communication with communication network 350 over backhaul link 321. Similarly, base station 330 communicates with communication network 350 over backhaul link 331.

Figure 4:
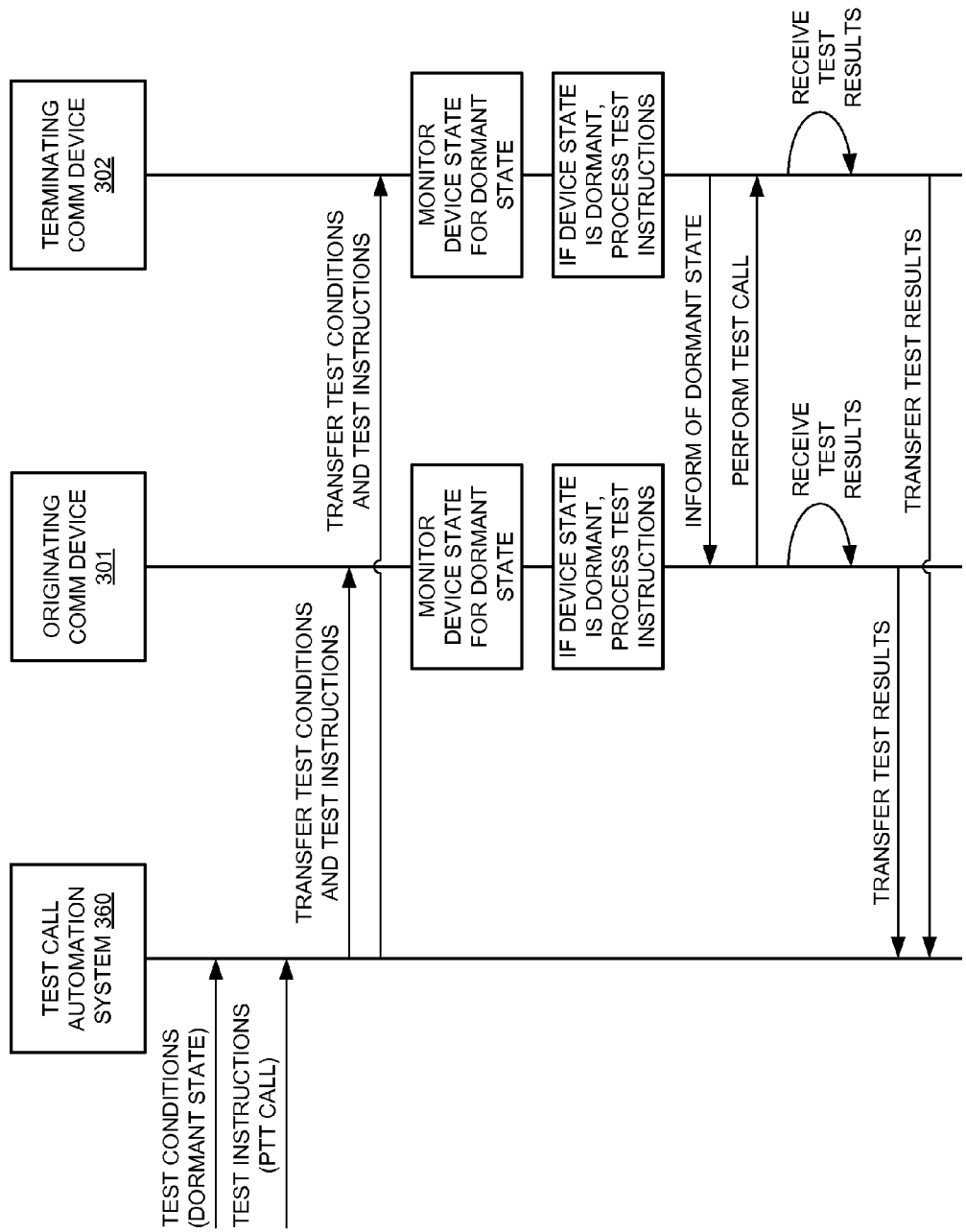
FIG. 4 is a sequence diagram that illustrates an operation of the communication system.

FIG. 4 is a sequence diagram that illustrates an operation of communication system 300. FIG. 4 provides an exemplary test call scenario in which EV-DO wireless communication devices 301 and 302 are instructed to perform a particular Push-to-talk (PTT) test call in which both devices 301 and 302 must be in a dormant state prior to executing the scenario. In this example, a user of test call automation system 360 selects the PTT test call scenario from a drop-down menu, and selects originating communication device 301 and terminating communication device 302 based on their geographic locations. Thus, test call automation system 360 receives test conditions indicating a dormant state is required by both communication devices 301 and 302 for the PTT test call scenario, and receives the test instructions for the PTT call.

Responsive to receiving the instructions for the PTT test call scenario, test call automation system 360 transfers the test conditions and the test instructions to originating device 301 and terminating device 302. In response to receiving the test conditions and instructions, communication devices 301 and 302 monitor their internal device states based on the test conditions. In this example, the test conditions require both the originating device 301 and the terminating device 302 to have entered a dormant state prior to placing the PTT test call. Dormant state identification is determined by monitoring for a MAC index value equal to 3. Thus, when devices 301 and 302 are dormant with a MAC index of 3, the test instructions are processed.

In this example test call scenario, the test instructions for originating communication device 301 and terminating communication device 302 are different. The test instructions transferred to terminating device 302 instruct device 302 to inform originating device 301 that device 302 is dormant and ready to receive the PTT test call. However, the test instructions for originating device 301 instruct device 301 to place the PTT test call to terminating device 302 in response to receiving a notification that device 302 is in a dormant state. Thus, without disrupting its dormancy, terminating device 302 informs originating device 301 of its dormant state by transferring a message to originating device 301 indicating that device 302 is ready to receive a test call.

In response to receiving the message that device 302 is in a dormant state, originating device 301 performs the test call by placing the PTT test call to terminating device 302. Each communication device 301 and 302 receives test results during and after execution of the test call scenario, and each device 301 and 302 records the test results that are requested in the test instructions. However, in some examples, no test results are specified in the test instructions. Instead, communication devices 301 and 302 could be programmed to receive a default set of test results comprising standard information associated with the particular test call scenario being executed. Regardless of the manner in which the test results are received and determined, originating communication device 301 and terminating communication device 302 automatically transfer the test results to test call automation system 360.

By monitoring for compliance with the test conditions, failed test calls are minimized, reducing the need for repeated attempts to perform the test call scenario. In this example, the user of test call automation system 360 is ensured that both the originating and terminating communication devices 301 and 302 are in a dormant state so that the PTT test call scenario will complete successfully. In this manner, network personnel may customize any desired test call scenario and ensure compliance with all specified test conditions.

Figure 5:
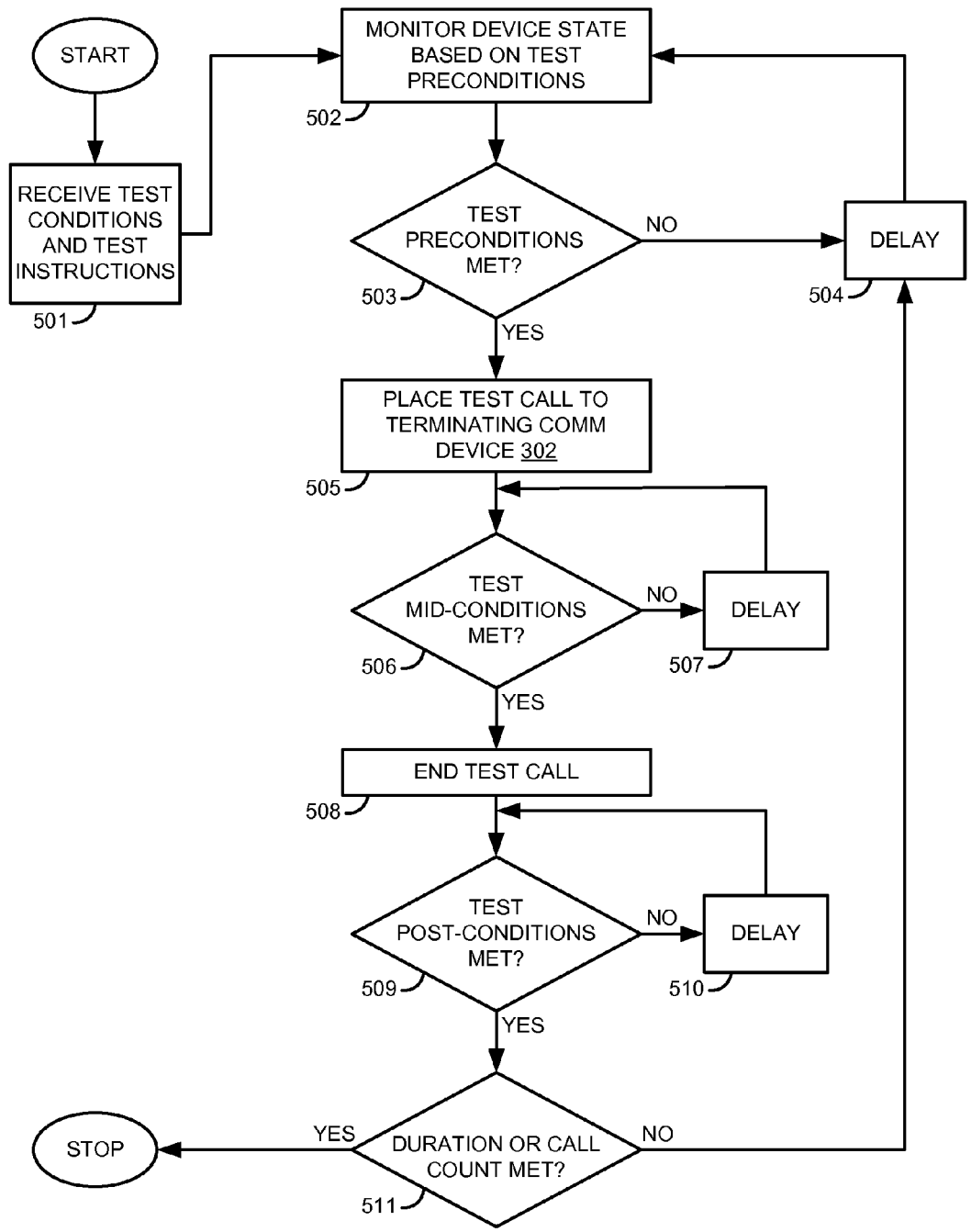
FIG. 5 is a flow diagram that illustrates an operation of the communication system.

FIG. 5 is a flow diagram that illustrates an operation of communication system 300. The steps of the operation are indicated below parenthetically. To begin, originating communication device 301 receives a set of test conditions and test instructions from test call automation system 360 (501). In FIG. 5, the test conditions comprise test preconditions required before the test call is initiated, test mid-conditions required during the test call, and test post-conditions required after the test call is terminated, and the test instructions comprise pre-test instructions, mid-test instructions, and post-test instructions. In this test call scenario, the test preconditions require an EV-DO capable communication device 101 or 102 to remain connected to a first serving sector for a duration of one minute with Bluetooth enabled, the test mid-conditions require that the device switch to a second serving sector during the test call, and the test post-conditions require that the device returns to the first serving sector after the test call is terminated.

In response to receiving the test conditions and instructions, originating communication device 101 monitors its device state based on the test preconditions (502). In this case, pursuant to the test preconditions, originating device 101 verifies that it has EV-DO communication capability and monitors the duration device 301 is connected to a first serving sector. In addition, the pre-test instructions direct originating device 301 to activate a Bluetooth function of device 301 to ensure Bluetooth is enabled prior to executing the test call scenario.

Originating device 301 monitors its device state based on the test preconditions until the test preconditions are met (503). If the test preconditions are not met, originating device 301 delays the test call (504) and continues to monitor its device state based on the test preconditions (502). In some examples, a timeout interval is supplied with the pre-test instructions which causes device 301 to abort monitoring the device state if sufficient time elapses before the test preconditions are met. However, once originating device 301 determines that it has EV-DO capability, Bluetooth is enabled, and a connection to a first serving sector has been maintained for at least one minute, the test preconditions are met and device 301 places a test call to terminating device 302 (505).

During the test call, originating device 301 monitors the device state of device 301 based on the test mid-conditions (506). In this case, the test mid-conditions specify that originating device 301 must switch to a second serving sector during the test call, which may be determined by monitoring the serving PN of originating device 301. If no handoff occurs, the test mid-conditions are not met and device 301 continues to monitor for compliance with the test mid-conditions and delays termination of the test call to a later time (507). Again, a timeout interval for compliance with the test mid-conditions may be provided to prevent device 301 from monitoring the device state in perpetuity. Once originating device 301 determines that the serving sector has changed during the test call, the test mid-conditions are met and device 301 terminates the test call (508). In some examples, the mid-test instructions require originating device 301 to perform a specified action during the test call, such as recording RSSI and SNR, in which case device 301 executes the mid-test instructions to complete the test call scenario prior to terminating the call.

After the test call is terminated, originating device 301 monitors its device state based on the test post-conditions (509). In this case, the test post-conditions require device 301 to return to the first serving sector after the test call is terminated. Thus, this particular test call scenario can still fail even after the test call is terminated if the test post-conditions are not met. If the test post-conditions are not met, originating device 301 delays further processing (510) and continues to monitor its device state based on the test post-conditions (509). However, if originating device 301 determines that a handoff has occurred back to the initial serving sector, the test post-conditions are met (509). Once the device state complies with the test post-conditions, originating device 301 processes the post-test instructions, if any. In this case, the post-test instructions direct device 301 to transfer the data recorded during the test call to test call automation system 360.

Finally, a duration or call count may be supplied with the test instructions. In this case, the process repeats until the duration for placing test calls has elapsed, or if the number of test calls placed matches the specified call count (511). In some examples, these conditions may be included in the test post-conditions. If a specified duration or call count has not been met, originating device 301 delays termination of the test call process (504) and initiates another test call scenario by monitoring the device state based on the test preconditions (502). In some examples, subsequent test call attempts may be governed by a different set of test conditions and test instructions than initial tests. Regardless, when a duration for the testing elapses or a call count is met (511), originating device 301 stops the test call process.

The operation of FIG. 5 provides an exemplary method of ensuring that test calls are placed only when the specified test conditions are met. Prior methods required a test engineer to repeatedly place test calls at regular intervals and then analyze call logs afterward to identify call instances that met the desired test scenario, or to attempt to induce the condition by physically moving device 301 near a sector boundary to cause a handoff. However, such methods are time consuming, cumbersome, and do not guarantee that the test call scenario will be executed successfully and in compliance with the test conditions.

Figure 6:
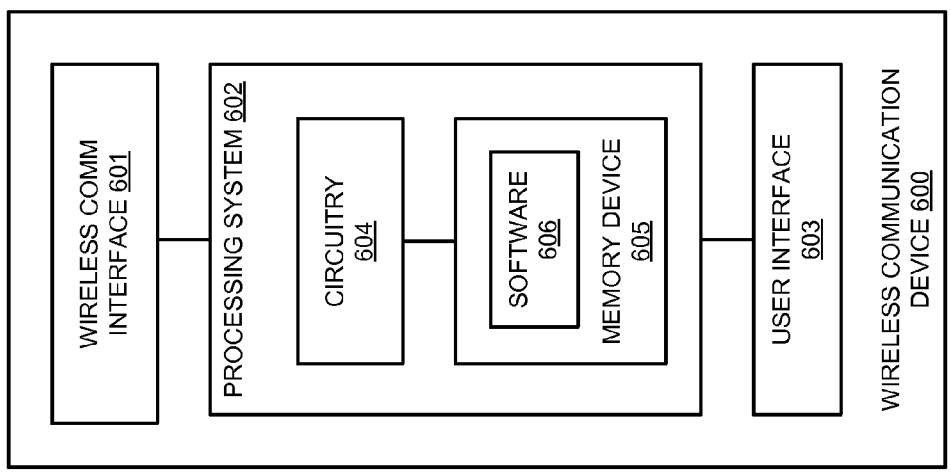
FIG. 6 is a block diagram that illustrates a wireless communication device.

FIG. 6 is a block diagram that illustrates wireless communication device 600. Wireless communication device 600 provides an example of wireless communication devices 101-104, although devices 101-104 could use alternative configurations. Wireless communication device 600 comprises wireless communication interface 601, processing system 602, and user interface 603. Processing system 602 is linked to wireless communication interface 601 and user interface 603. Processing system 602 includes processing circuitry 604 and memory device 605 that stores operating software 606. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, GSM, UMTS, HSPA, EV-DO, EV-DO rev. A, 3GPP LTE, WiMAX, Wi-Fi, or some other wireless communication format. Wireless communication interface 601 is configured to receive test conditions and test instructions from a test call automation system and transfer test results to the test call automation system.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof.

Processing circuitry 604 comprises microprocessor and other circuitry that retrieves and executes operating software 606 from memory device 605. Memory device 605 comprises a disk drive, flash drive, data storage circuitry, or some other memory apparatus. Processing circuitry 604 is typically mounted on a circuit board that may also hold memory device 605 and portions of communication interface 601 and user interface 603. Operating software 606 comprises computer programs, firmware, or some other form of machine-readable processing instructions. Operating software 606 may include an operating system, utilities, drivers, network interfaces, applications, or some other type of software. When executed by processing circuitry 604, operating software 606 directs processing system 602 to operate wireless communication device 600 as described herein. In particular, operating software 606 directs processing system 602 to monitor a device state of wireless communication device 600 based on a set of test conditions, and if the device state complies with the set of test conditions, then process test instructions to execute a test call scenario, receive test results associated with the test call scenario, and transfer the test results to a test call automation system.

Figure 7:
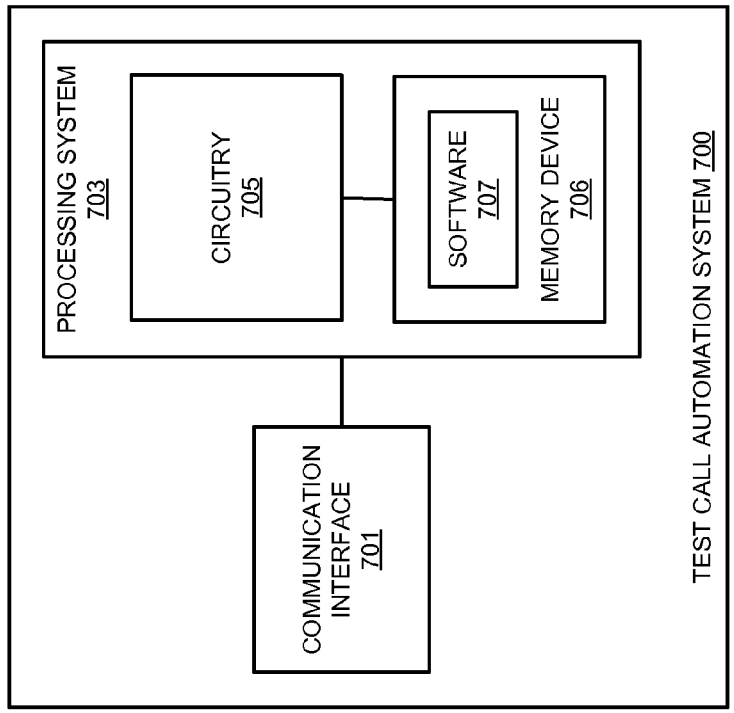
FIG. 7 is a block diagram that illustrates a test call automation system.

FIG. 7 is a block diagram that illustrates test call automation system 700. Test call automation system 700 provides an example of test call automation system 160, although system 160 may use alternative configurations. Test call automation system 700 comprises communication interface 701 and processing system 703. Processing system 703 is linked to communication interface 701. Processing system 703 includes processing circuitry 705 and memory device 706 that stores operating software 707.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate test call automation system 700 as described herein. In particular, operating software 707 directs processing system 703 to receive a set of test conditions and test instructions associated with a test call scenario, transfer the test conditions and the test instructions to at least one wireless communication device, and receive test results from a wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of automating test calls in a wireless communication network, the method comprising:
in a test call automation system,
receiving a set of test conditions and test instructions associated with a test call scenario; and
transferring the test conditions and the test instructions to at least one wireless communication device;
in the wireless communication device,
monitoring a device state of the wireless communication device based on the test conditions;
if the device state complies with the set of test conditions, then processing the test instructions to execute the test call scenario;
receiving test results associated with the test call scenario;
transferring the test results to the test call automation system; and
wherein the test conditions comprise test preconditions required before a test call is initiated, test mid-conditions required during the test call, and test post-conditions required after the test call is terminated, and wherein the test instructions comprise pre-test instructions, mid-test instructions, and post-test instructions.

2. The method of claim 1 wherein processing the test instructions to execute the test call scenario comprises initiating the test call by calling a target wireless communication device.

3. The method of claim 1 wherein processing the test instructions to execute the test call scenario comprises transferring a message to another wireless communication device indicating that the wireless communication device is ready to receive the test call.

4. The method of claim 1 wherein monitoring the device state of the wireless communication device comprises monitoring the device state of the wireless communication device based on the test preconditions required before the test call is initiated.

5. The method of claim 1 further comprising:
in the wireless communication device,
monitoring the device state of the wireless communication device during the test call based on the test mid-conditions; and
if the device state complies with the test mid-conditions, then processing the mid-test instructions to complete the test call.

6. The method of claim 1 further comprising:
in the wireless communication device,
monitoring the device state of the wireless communication device after the test call based on the test post-conditions; and
if the device state complies with the test post-conditions, then processing the post-test instructions.

7. The method of claim 1 wherein the test conditions comprise device status metrics associated with an external environment of the wireless communication device.

8. The method of claim 1 wherein the test conditions comprise error conditions associated with the wireless communication device.

9. The method of claim 1 wherein receiving the test conditions and the test instructions associated with the test call scenario comprises receiving the test conditions and the test instructions from a user of the test call automation system.

10. A communication system for automating test calls in a wireless communication network, the system comprising:
a test call automation system configured to receive a set of test conditions and test instructions associated with a test call scenario, and transfer the test conditions and the test instructions to at least one wireless communication device;
the wireless communication device configured to monitor a device state of the wireless communication device based on the test conditions, and if the device state complies with the set of test conditions, then process the test instructions to execute the test call scenario, receive test results associated with the test call scenario, and transfer the test results to the test call automation system; and
wherein the test conditions comprise test preconditions required before a test call is initiated, test mid-conditions required during the test call, and test post-conditions required after the test call is terminated, and wherein the test instructions comprise pre-test instructions, mid-test instructions, and post-test instructions.

11. The system of claim 10 wherein the wireless communication device, to process the test instructions to execute the test call scenario, initiates the test call by calling a target wireless communication device.

12. The system of claim 10 wherein the wireless communication device, to process the test instructions to execute the test call scenario, transfers a message to another wireless communication device indicating that the wireless communication device is ready to receive the test call.

13. The system of claim 10 wherein the wireless communication device, to monitor the device state of the wireless communication device, monitors the device state of the wireless communication device based on the test preconditions required before the test call is initiated.

14. The system of claim 10 further comprising:
the wireless communication device configured to monitor the device state of the wireless communication device during the test call based on the test mid-conditions, and if the device state complies with the test mid-conditions, then process the mid-test instructions to complete the test call.

15. The system of claim 10 further comprising:
the wireless communication device configured to monitor the device state of the wireless communication device after the test call based on the test post-conditions, and if the device state complies with the test post-conditions, then process the post-test instructions.

16. The system of claim 10 wherein the test conditions comprise device status metrics associated with an external environment of the wireless communication device.

17. The system of claim 10 wherein the test conditions comprise error conditions associated with the wireless communication device.

18. A method of automating test calls in a wireless communication network, the method comprising:
in a test call automation system,
receiving a set of test conditions and test instructions associated with a test call scenario, wherein the test instructions comprise pre-test instructions, mid-test instructions, and post-test instructions; and
transferring the test conditions and the test instructions to at least one wireless communication device;
in the wireless communication device,
processing the test conditions to determine whether test preconditions are required before a test call is initiated, whether test mid-conditions are required during the test call, and whether test post-conditions are required after the test call is terminated;

if the test preconditions are required before the test call is initiated, monitoring a device state of the wireless communication device based on the test preconditions, and if the device state complies with the test preconditions, then processing the pre-test instructions to initiate the test call by calling a target wireless communication device;

if the test mid-conditions are required during the test call, monitoring the device state of the wireless communication device during the test call based on the test mid-conditions, and if the device state complies with the test mid-conditions, then processing the mid-test instructions to complete the test call;

if the test post-conditions are required after the test call is terminated, monitoring the device state of the wireless communication device after the test call is terminated based on the test post-conditions, and if the device state complies with the test post-conditions, then processing the post-test instructions;

receiving test results associated with the test call scenario; and transferring the test results to the test call automation system.

* * * * *